United States Patent [19]
Laboch et al.

[11] Patent Number: 6,019,446
[45] Date of Patent: Feb. 1, 2000

[54] METAL FRAME WITH A HYPERSTATIC ASSEMBLY WEDGE, NOTABLY FOR AN ELECTRICAL CABINET FRAMEWORK

[75] Inventors: Kazimir Laboch, Meylan; Jean-Pierre Pin, St. Etienne de Saint Geoirs, both of France

[73] Assignee: Schneider Electric SA, France

[21] Appl. No.: 09/033,689

[22] Filed: Mar. 3, 1998

[30] Foreign Application Priority Data

Mar. 21, 1997 [FR] France .................................. 97 03720

[51] Int. Cl.[7] .................................................. A47B 47/00
[52] U.S. Cl. .................................... 312/265.1; 312/265.2; 312/265.4; 211/26
[58] Field of Search ............................ 312/265.1, 265.2, 312/265.3, 265.4, 265.5, 265.6, 257.1, 263, 111, 140; 211/26, 189, 184, 191; 361/724, 725; 52/653.1, 653.2

[56] References Cited

U.S. PATENT DOCUMENTS

| | | | |
|---|---|---|---|
| 3,265,419 | 8/1966 | Durnbaugh et al. | 312/265.1 X |
| 3,307,894 | 3/1967 | Collier | 312/265.2 |
| 3,877,765 | 4/1975 | Hassing | 312/265.4 |
| 4,973,110 | 11/1990 | Nyquist | 312/265.2 X |
| 5,228,762 | 7/1993 | Mascrier | 312/265.4 |
| 5,639,150 | 6/1997 | Anderson et al. | 312/265.2 X |

FOREIGN PATENT DOCUMENTS

| | | | |
|---|---|---|---|
| 1249478 | 9/1967 | Germany | 312/265.2 |
| 2013349 | 10/1971 | Germany | 312/265.4 |
| 2362538 | 6/1975 | Germany | 312/265.1 |
| 2746545 | 4/1979 | Germany . | |
| 8501810 | 4/1985 | Germany . | |
| 19622735 | 12/1996 | Germany . | |
| 613020 | 11/1960 | Italy | 312/265.2 |

*Primary Examiner*—Peter M. Cuomo
*Assistant Examiner*—James O. Hansen
*Attorney, Agent, or Firm*—Parkhurst & Wendel, L.L.P.

[57] ABSTRACT

A metal frame for an electrical cabinet comprises an assembly of uprights and cross-members forming a framework with high mechanical rigidity. Each upright is provided with a support equipped with four bearing surfaces designed to cooperate with two positioning surfaces of conjugate shapes of a cross-member of the first series to form a fixing device with a hyperstatic wedge when the fixing screw is tightened, which screw passes through a hole of the corresponding cross-member, and cooperating with a lock-nut secured to the support. The nut has a tapped hole arranged in the center of symmetry of the four bearing surfaces of the housing.

10 Claims, 7 Drawing Sheets

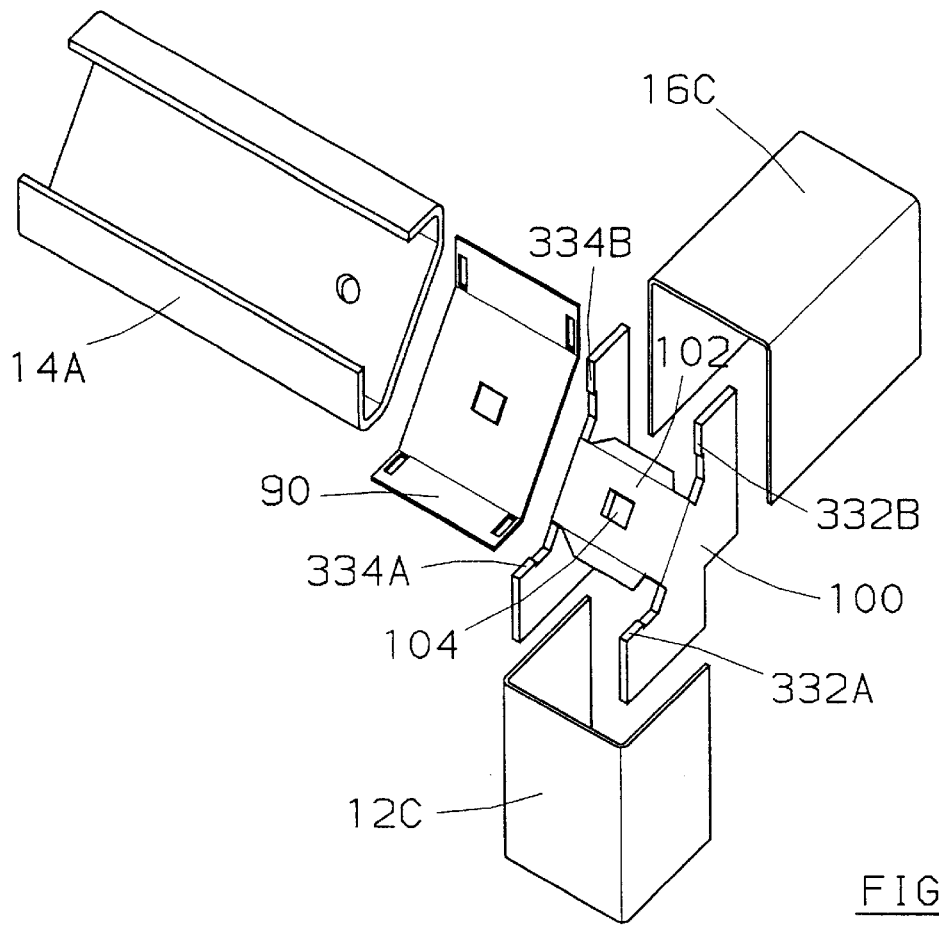
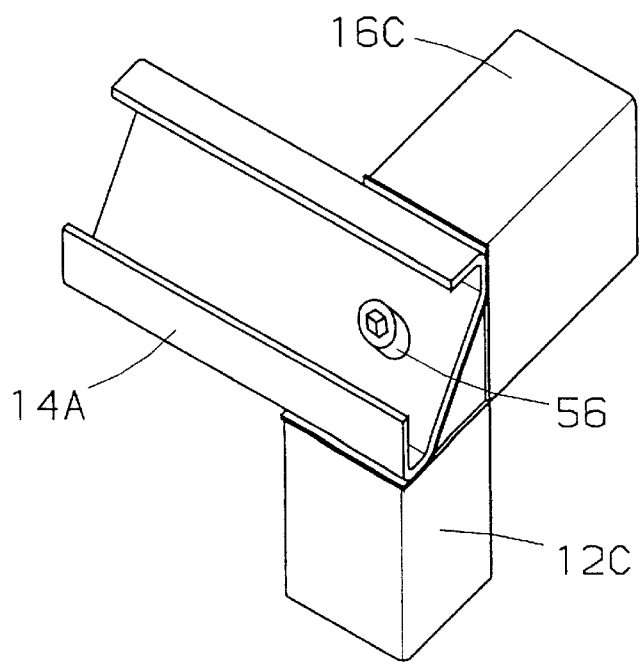

METAL FRAME WITH A HYPERSTATIC ASSEMBLY WEDGE, NOTABLY FOR AN ELECTRICAL CABINET FRAMEWORK

BACKGROUND OF THE INVENTION

The invention relates to a metal frame, in particular for an electrical cabinet, comprising:

vertical uprights in the form of pillars with U-shaped profiled section base, a first series of horizontal cross-members extending parallel to one another in the widthwise direction of the cabinet, a second series of cross-members perpendicular to the cross-members of the first series and extending in the depthwise direction of the cabinet, and fixing means to assemble said cross-members of the two series to the uprights so as to constitute a framework in the form of a rectangle.

Assembling a metal framework of an electrical cabinet generally requires a large number of assembly and fixing parts to give the framework sufficient mechanical rigidity. The structure of the uprights and cross-members moreover presents complex specific shapes. This results in relatively long assembly times and high manufacturing costs The design of a framework of this kind does not make wiring operations at the top or the bottom of the cubicle easy.

SUMMARY OF THE INVENTION

The object of the invention is to achieve a metal framework for an electrical cabinet with simplified assembly and connection, and having a high mechanical rigidity.

The metal frame according to the invention is characterized in that each upright is provided with a support means equipped with four bearing surfaces designed to cooperate with two positioning surfaces of conjugate shapes of a cross-member of the first series to form a fixing device with a hyperstatic wedge when the fixing means are securely tightened.

According to one feature of the invention, the fixing means comprise a central screw passing through a hole of the corresponding cross-member and cooperating with a lock-nut secured to the support means, said nut having a tapped hole arranged at the center of symmetry of the four bearing surfaces of said housing.

According to a first embodiment, the support means is formed by a housing cut out in each upright. The lock-nut is inserted inside the U of the upright at the level of the housing. The housing of each U-shaped upright is bounded by two parallel, horizontal edges arranged in the common body, and two identical cutouts arranged in the two branches and supporting said bearing surfaces.

According to a second embodiment, the support means of the fixing device with hyperstatic wedge is formed by a joining part fixedly secured to the upright and to the cross-member of the second series by assembly means, said part comprising four bearing surfaces and a central spacer equipped with a hole for the fixing means to pass through.

At the bottom part of the framework, it is easy to integrate a base, and an on-site levelling system, associated to a device for fixing the framework to the ground.

BRIEF DESCRIPTION OF THE DRAWINGS

Other advantages and features will become more clearly apparent from the following description of different embodiments of the invention given as non-restrictive examples only and represented in the accompanying drawings in which:

FIG. 5 is an exploded perspective view of another alternative embodiment;

FIG. 6 shows the assembly device of FIG. 5 in the assembled position.

DETAILED DESCRIPTION OF THE PREFERRED EMBODIMENT

Figure 1:
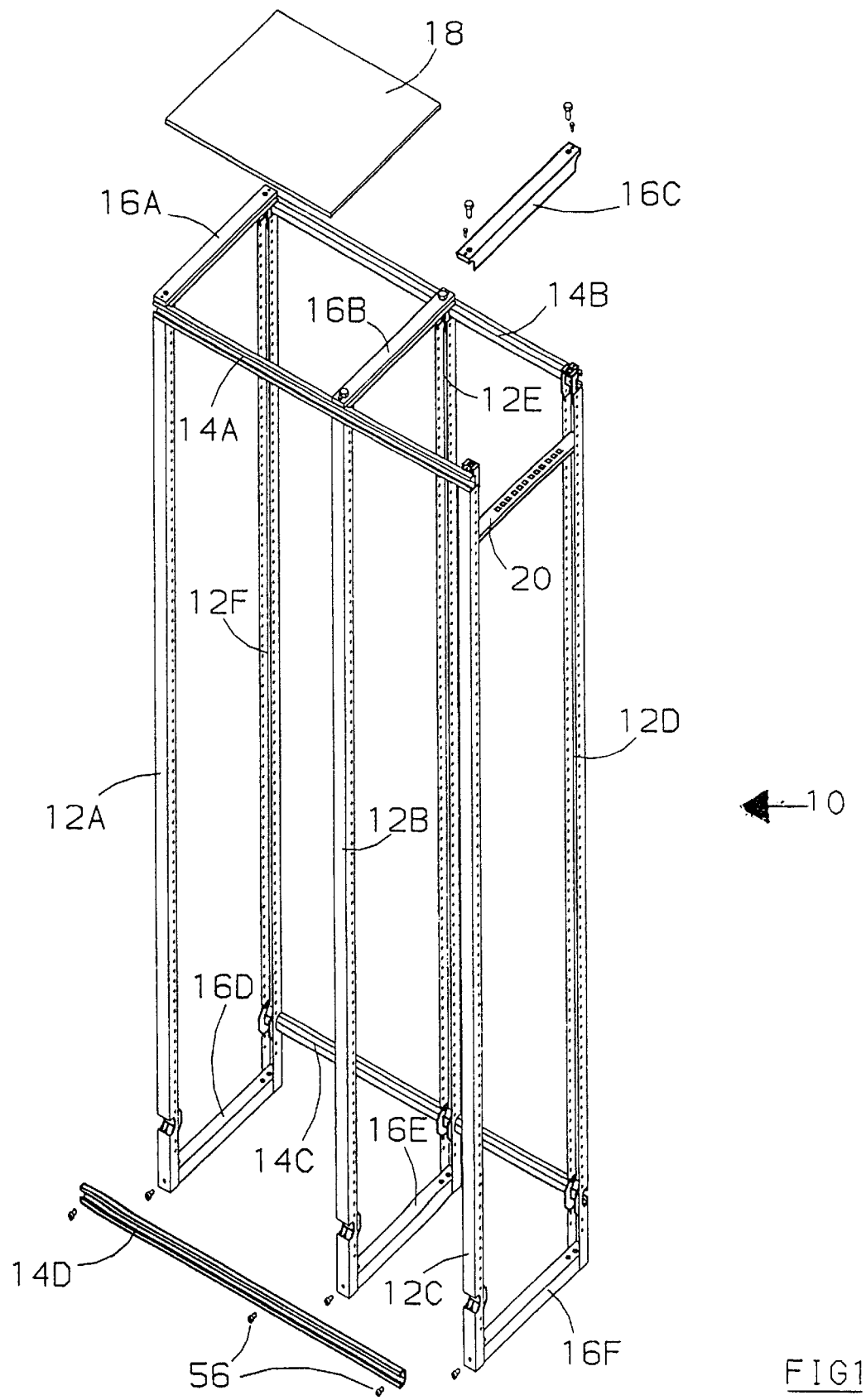
FIG. 1 is a perspective view of the framework according to the invention.

With reference to FIG. 1, a metal frame 10 of an electrical cabinet is formed by assembly of vertical uprights 12A, 12B, 12C, 12D, 12E, 12F in the form of U-shaped sections, and of two series of perpendicular cross-members 14A, 14B, 14C, 14D; 16A, 16B, 16C, 16D, 16E, 16F arranged in two horizontal planes in such a way as to confine a framework having the profile of a rectangle. The horizontal cross-members 14A to 14D of the first series extend parallel to one another in the widthwise direction of the cabinet, whereas the cross-members 16A to 16F of the second series are perpendicular to the cross-members 14A to 14D and extend in the depthwise direction of the frame 10.

The front face of the frame 10 is defined by the front uprights 12A, 12B, 12C and the front cross-members 14A, 14D. The rear face of the frame 10 comprises the rear uprights 12F, 12E, 12D and the cross-members 14B, 14C. The assembly zone of the uprights 12A–12F to the different cross-members 14A–14D, 16A–16F is located at the top part of the frame 10, and close to the bottom part.

A blanking plate 15 can be fitted on the upper cross-members 16A, 16B, 16C to constitute a flat roof. A spacer 20 for support of a busbar is arranged at a small distance underneath the cross-member 16C and is secured between the two uprights is 12C, 12D. Removing the cross-member 16C facilitates access to the spacer 20, notably when an additional busbar of an adjacent cubicle is connected by means of fish-plates.

Figure 2A:
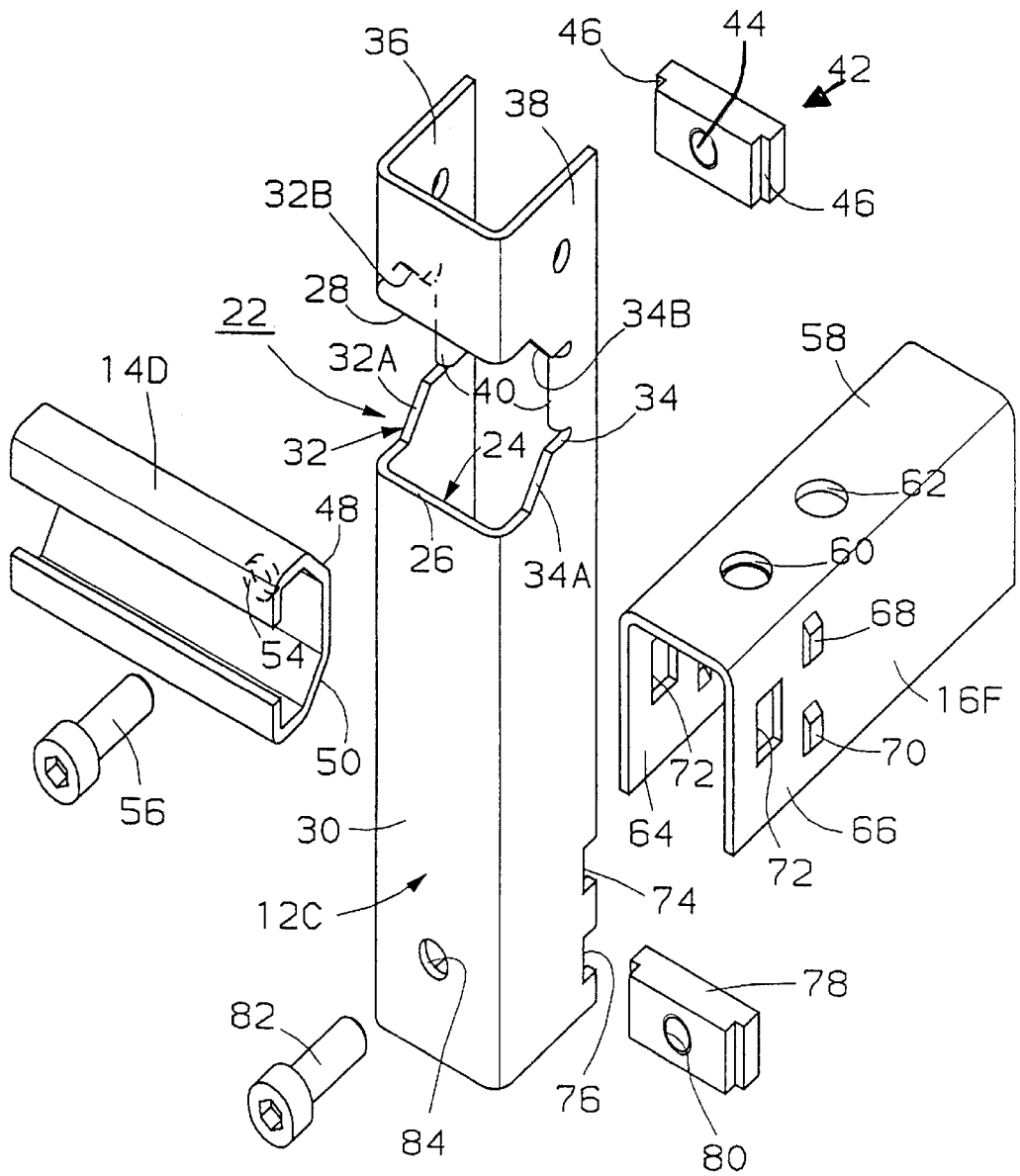
FIG. 2A shows an exploded perspective view of the system for assembling an upright to the bottom cross-members.

In FIGS. 2A and 28, assembly of the horizontal cross-member 14D on the vertical upright 12C is performed at the bottom part of the frame 10 by means of a fixing device with a hyperstatic wedge, designated by the general reference 22. The U-shaped upright 12C is provided with a housing 24 bounded by two horizontal and parallel edges 26, 28 arranged in the common body 30, and by two identical cutouts 32, 34 in the two U-shaped branches 36, 38. Each cutout 32, 34 comprises two bearing surfaces 32A, 328; 34A, 34B at the level of the corresponding branch 36, 38, which are separated from one another by an intermediate tab 40 folded inwards through 180°.

A lock-nut 42 with a tapped hole 44 is fitted inside the U of the upright 12C and comprises two opposite shoulders 46 pressing against the ends of the tabs 40 so as to position the hole 44 of the nut 42 at the center of symmetry of the four bearing surfaces 32A, 32B; 34A, 34B of the housing 22.

The horizontal cross-member 14D is formed by a C-shaped or omega-shaped profiled section having two external positioning surfaces 48, 50 extending in the longitudinal direction and designed to come into engagement against the four bearing surfaces 32A, 32B; 34A, 34B inside the housing 24. The oblique positioning surface 48 has a conjugate shape to that of the bearing surfaces 32B; 34B situated above the two tabs 40. The same is true for the other positioning surface 50 designed to cooperate with the two bearing surfaces 32A, 34A situated below the intermediate tabs 40. The middle surface 52 of the profiled section of the cross-member 14D is provided with a hole 54 (in a broken line in FIG. 2A) enabling a fixing screw 56 to pass through.

To assemble the cross-member 14D to the upright 12C, the nut 42 simply has to be inserted from the rear of the U locking it against the tabs 40, and the fixing screw 56 then has to be tightened after the cross-member 14D has been inserted in the housing 24 (FIG. 28). This results in an assembly with a hyperstatic wedge with securing of the assembly by a single screw 56 guaranteeing a high mechanical rigidity due to the uniform distribution of the clamping pressure on the four bearing surfaces 32A, 32B; 34A, 348 of the housing 24.

Three fixing screws 56 are required to assemble the cross-member 14D onto the three uprights 12A, 12B, 12C.

The cross-member 16F is formed by a reverse U-shaped section having a common body 58 in which two holes 60, 62 are drilled, and two parallel wings 64, 66 each equipped with two bosses 68, 70, and an aperture 72. The external distance between the two wings 64, 66 is slightly smaller than the distance between the internal surfaces of the branches 36, 38 of the upright 12C, so as to enable the cross-member 16F to be inserted inside the U of the upright 12C until the bosses 68, 70 come up against the stop formed by the cutouts 74, 76 made in each branch 36, 38 of the upright 12C. A lock-nut 78 with a tapped hole 80 has previously been inserted in the apertures 72 of the two wings of the cross-member 16F.

Assembling the cross-member 16F to the upright 12C is performed by means of a fixing screw 82 accessible from the front of the frame 10 passing through a hole 84 arranged in the body 30 of the upright 12C and screwed into the lock-nut 78.

The first aperture 60 of the cross-member 16F enables an adjustment screw (not represented) to pass through forming part of an on-site levelling system. Fixing the frame 10 to the ground is performed by means of a fixing screw (not represented) passing through the second aperture 62 of the bottom cross-member 16F.

Figure 2B:
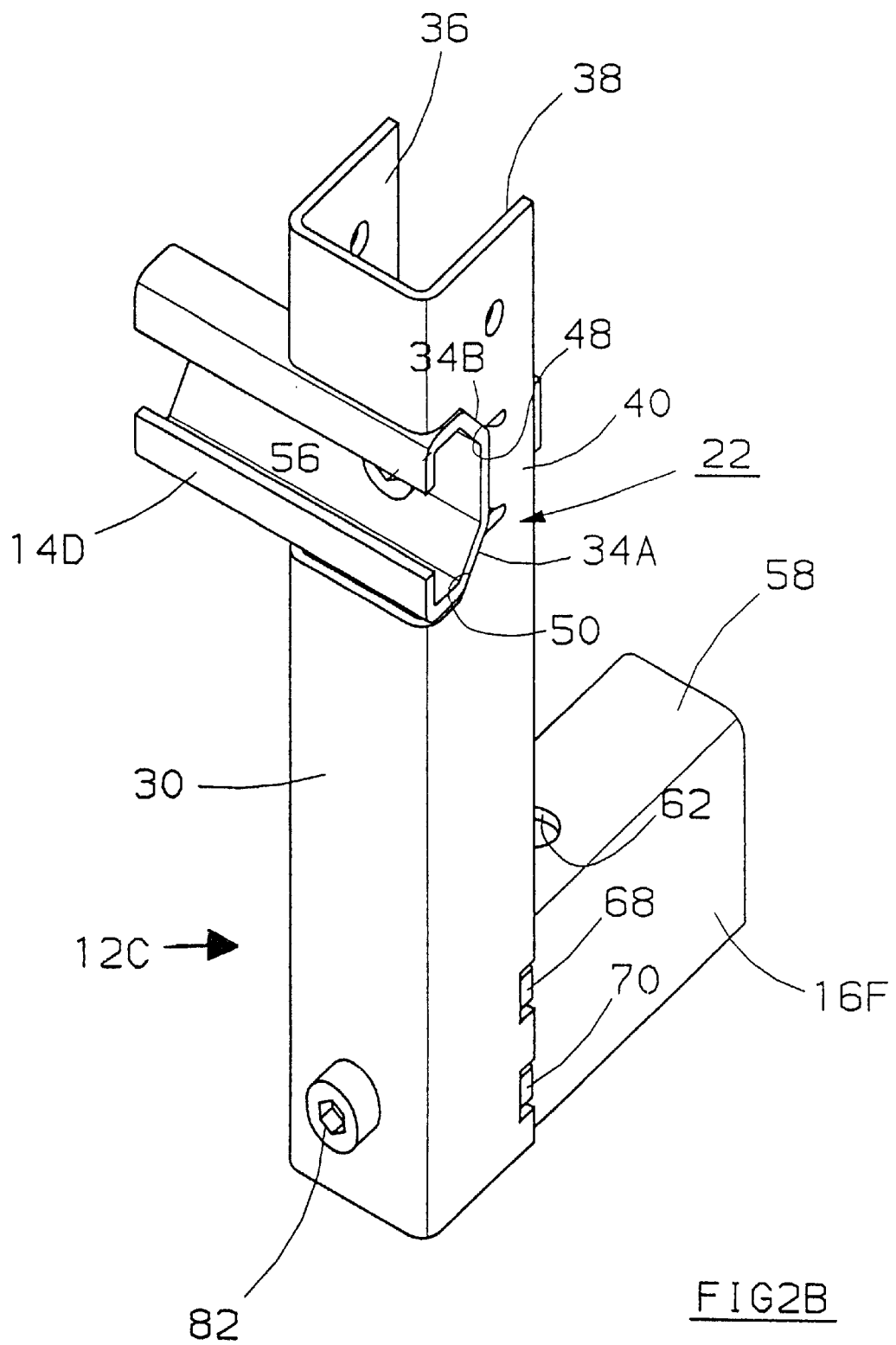
FIG. 2B is an identical view to FIG. 2A in the assembled position of the system for assembling.
Figure 3:
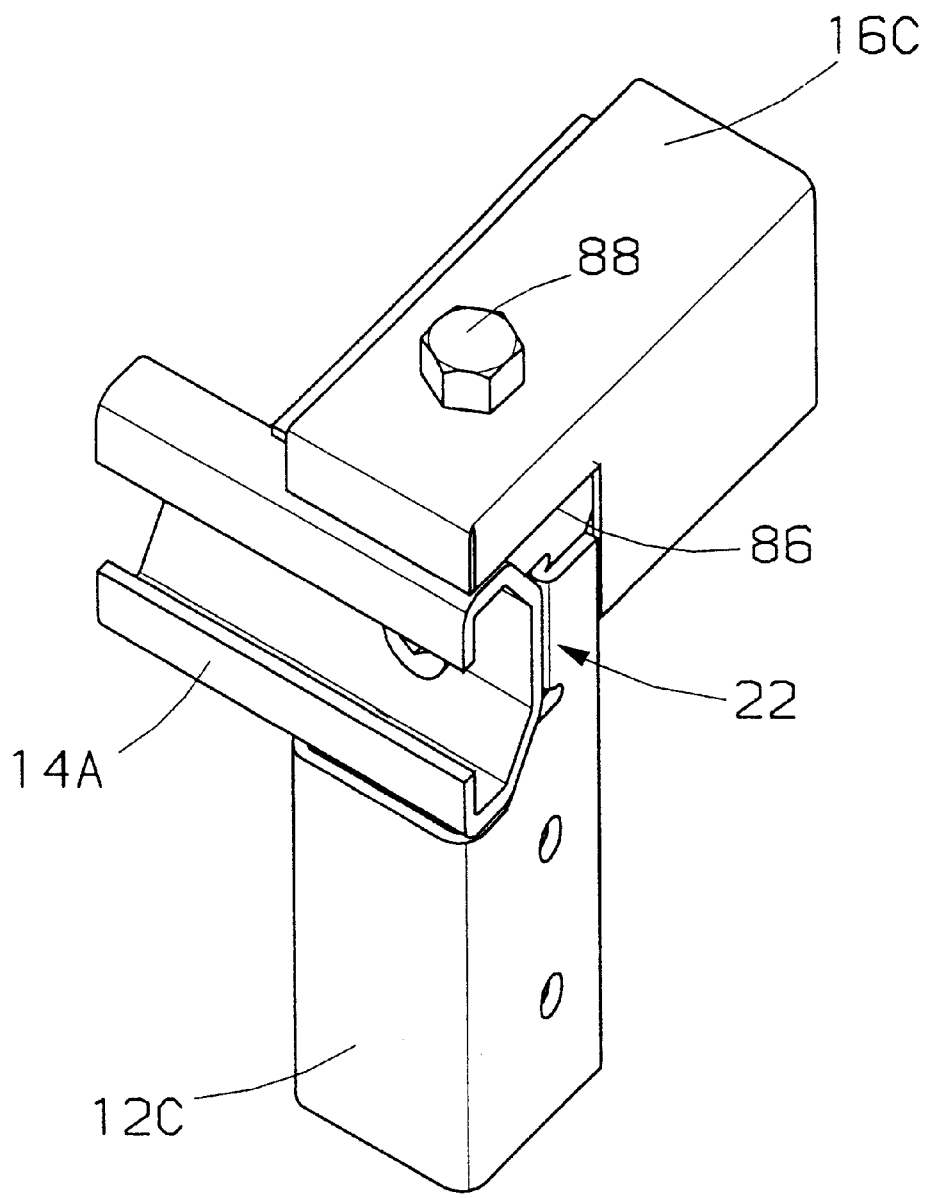
FIG. 3 represents an identical view to FIG. 2B for the system for assembling an upright to the top cross-members.

With reference to FIG. 3, assembly of the horizontal cross-member 14A to the top part of the upright 12C is achieved by means of a fixing device with hyperstatic wedge 22 of the same type as that described with reference to FIGS. 2A and 2B. The structure of the top cross-member 14A is identical to that of the bottom cross-member 14D. The end of the depthwise cross-member 16C comprises a shoulder 86 covering the top of the upright 12C, and a terminal part of the horizontal cross-member 14A. Assembly of the cross-member 16C on the upright 12C is achieved by means of a fixing screw 88 designed to be screwed into a cage nut of the upright 12C.

The profiled section constituting the horizontal cross-members 14A, 14B, 14C, 14D may be of any shape provided that it has two positioning surfaces at the rear.

Figure 4A:
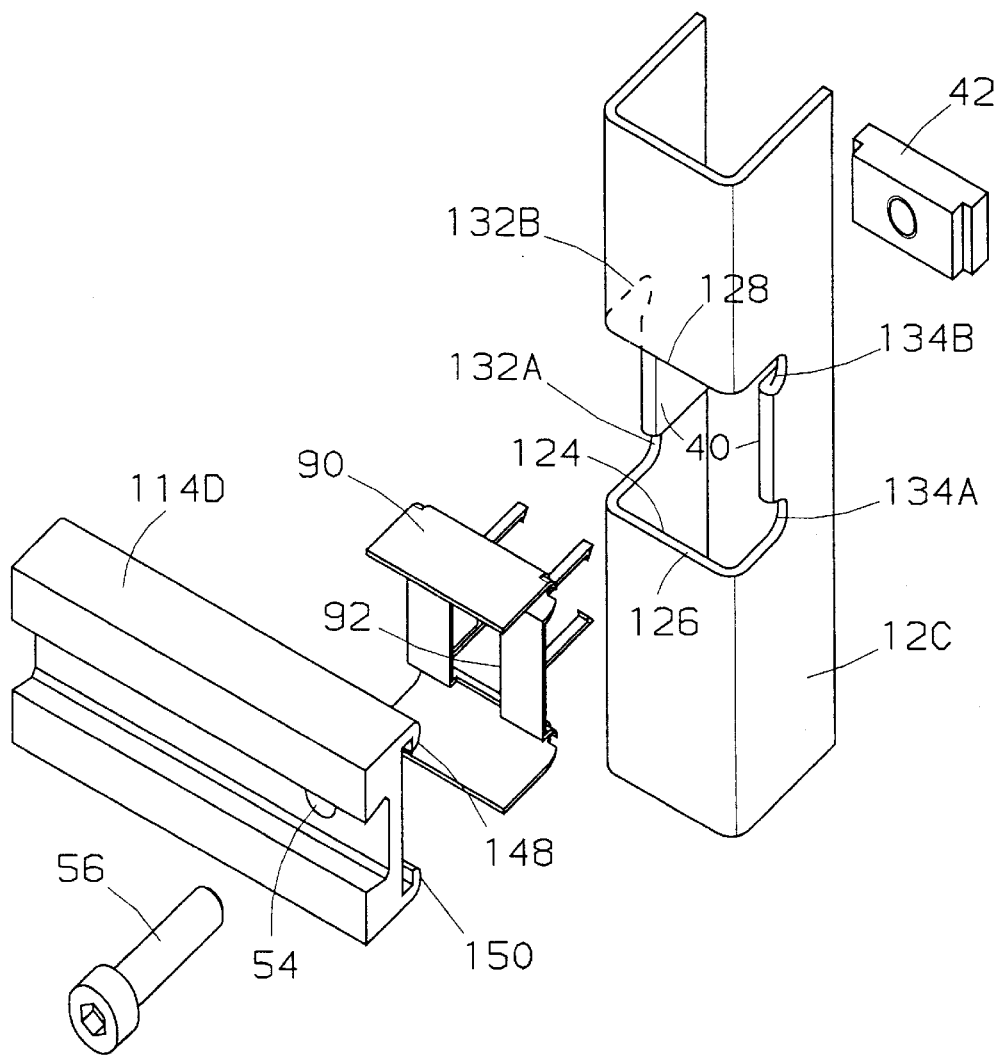
FIG. 4A is an identical view to FIG. 2A of an alternative embodiment.

In FIG. 4A, the cross-member 114D is H-shaped having two continuous positioning surfaces 148, 150 at its rear part designed to cooperate with four bearing surfaces 132A, 132B, 134B, 134A when the upright 12C is inserted in the housing 124. A locknut 42, comparable to that of FIG. 2A, is inserted in the U-shaped section of the upright 12C to enable assembly by the fixing screw 82. A sealing point 90 made of molded elastomer material, is inserted between the positioning surfaces 148, 150 of the cross-member 114D and the bearing surfaces 132A, 1326, 134B, 134A of the upright 12C following the shape of the housing 124 exactly.

Securing of the assembly by means of the single fixing screw 82 constitutes a tightly sealed assembly with hyperstatic wedge.

Figure 4B:
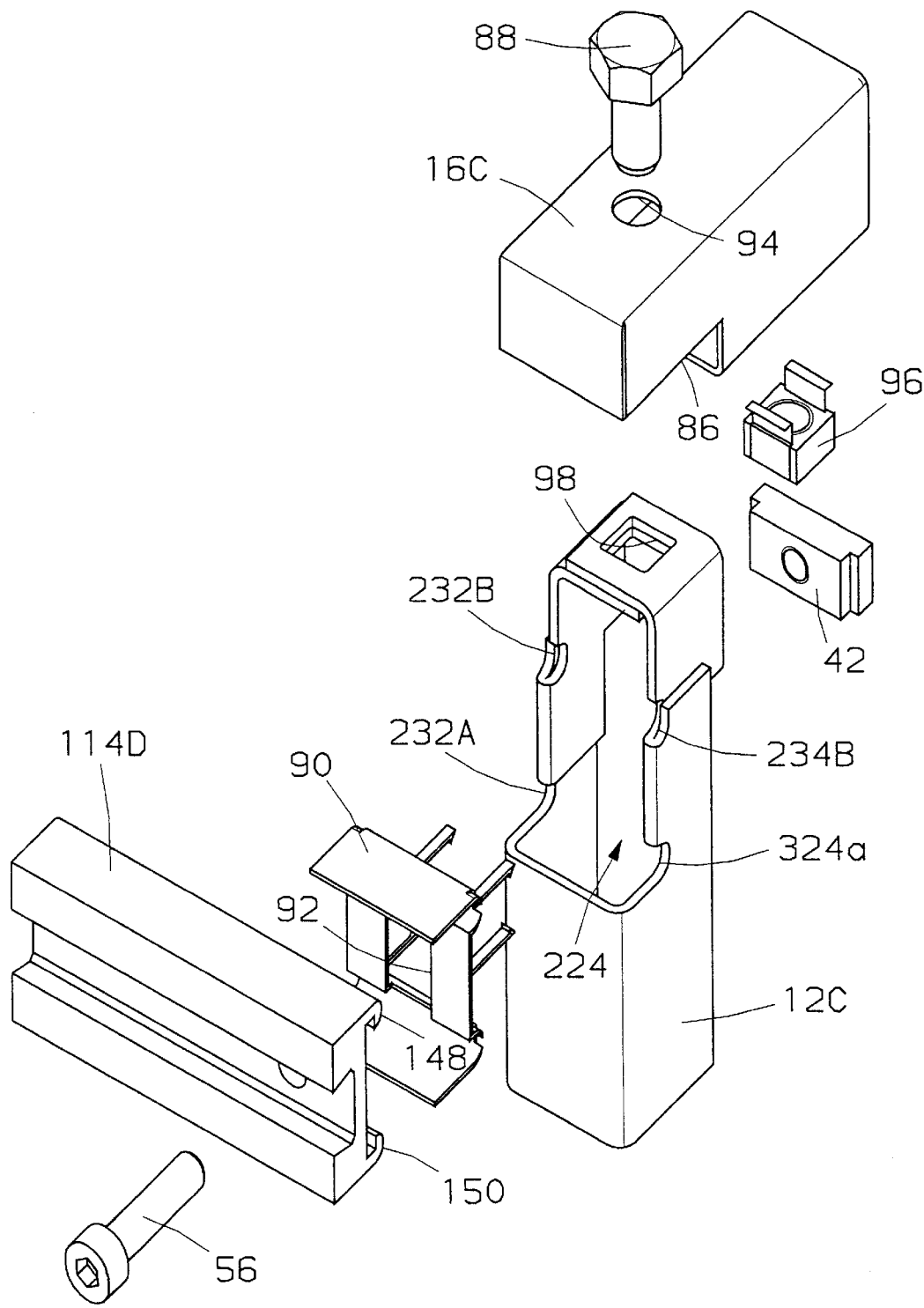
FIG. 4B shows an exploded perspective view of an alternative system for assembling an upright to the top cross-members.

In FIG. 4B, the same cross-member 114D of identical structure to that of FIG. 4A is used for the upper part of the assembly. The four bearing surfaces 232A, 232B, 234A, 234B, of the housing 224 arranged in the upright 12C have conjugate shapes to those of the positioning surfaces 148, 150 of the cross-member 114D, and the seal 90 has a central hole 92 for passage of the screw 56. Fixing of the cross-member 16C onto the upright 12C is achieved by means of the screw 88 passing through a hole 94 of the cross-member 16C and screwed into a clasp nut 96 fitted captive in an orifice 98 of the upright 12C.

The use of fixing devices with hyperstatic wedge 22 for assembly of the different cross-members 14A–14D; 16A–16F to the corresponding uprights 12A–12F enables the assembly time of the frame 10 to be reduced while at the same time increasing the mechanical rigidity of the structure It is also possible, in the connection plan of the cubicle on site, to remove certain uprights temporarily to make wiring and maintenance operations easier. A temporary disassembly of this kind is also valid for fitting cables at the top or bottom of the cubicle.

With reference to FIGS. 5 and 6, the fixing device with hyperstatic wedge can also be achieved by means of a joining part 100 fixedly secured to the upright 12C and cross-member 16C by assembly means, notably by welding, riveting or clasping. The joining part 100 is provided with four bearing surfaces 332A, 332B, 334A, 334B and an inclined central spacer 102 having a hole 104 for the fixing screw 56 to pass through. The seal 90 is fitted between the joining part 100 and the longitudinal cross-member 14A. The use of this joining part 100 enables off-the-shelf U-shaped uprights 12A–12F and cross-members 16A–16F to be used.

We claim:

1. A metal frame, for a cabinet, comprising:

vertical uprights forming pillars with a U-shaped profiled section base, a first series of horizontal cross-members extending parallel to one another in the widthwise direction of the cabinet, a second series of cross-members perpendicular to the cross-members of the first series and extending in the depthwise direction of the cabinet, fixing means to assemble said cross-members of the two series to the uprights to constitute a rectangular framework, support means arranged in each upright and equipped with four load bearing surfaces cooperating with two positioning surfaces of conjugate shapes located in a cross-member of the first series, said support means form fixing devices with hyperstatic wedge shapes when the fixing means are securely tightened, and a central screw of the fixing means passing through a hole of said cross-member, and cooperating with a lock-nut for securing said cross-member to the support means, said nut having a tapped hole arranged at the center of symmetry of said four load bearing surfaces.

2. The metal frame for a cabinet according to claim 1, wherein the support means is comprised of a housing formed in each U-shaped upright, having a common body and two lateral branches.

3. The metal frame for a cabinet according to claim 2, wherein the lock-nut is inserted inside the U-shaped upright at a level of said housing.

4. The metal frame for a cabinet according to claim 2, wherein the housing of each U-shaped upright is bounded by two parallel, horizontal edges arranged in the common body, and two identical cutouts arranged in the two lateral branches and supporting said load bearing surfaces.

5. The metal frame for a cabinet according to claim 1, wherein the four load bearing surfaces are oblique or curved.

6. The metal frame for an electrical cabinet according to claim 1, wherein a seal is inserted between the positioning surfaces and said load bearing surfaces to obtain a tight assembly with a hyperstatic wedge.

7. The metal frame for a cabinet according to claim 1, wherein the support means of a fixing device is formed by a joining part fixedly secured to the upright and to the cross-member of the second series by assembly means, said part comprising four load bearing surfaces and a central spacer equipped with a hole for the fixing means to pass through.

8. The metal frame for a cabinet according to claim 1, wherein each cross-member of the second series arranged at the bottom of the frame, is equipped with a first aperture for an adjustment screw of a leveling system to pass through, and a second aperture for passage of a screw for fixing the frame to a ground surface.

9. The metal frame for a cabinet according to claim 1, wherein each cross-member of the second series arranged at the top of the frame, comprises a shoulder covering the upright and a part of the cross-member of the first series.

10. The metal frame for a cabinet according to claim 1, wherein a spacer for support of a busbar is arranged at a distance underneath a cross-member of the second series and is secured between two of said vertical uprights.

\* \* \* \* \*